(12) United States Patent
Henningsson et al.

(10) Patent No.: US 6,384,699 B1
(45) Date of Patent: May 7, 2002

(54) TUNING ARRANGEMENT FOR A CAVITY FILTER

(75) Inventors: Bo Uno Egon Henningsson, Haninge; Torbjörn Ahl, Stockholm; Sven Patrik Lindell, Järfälla, all of (SE)

(73) Assignee: Telefonaktiebolaget LM Ericsson (publ), Stockhlom (SE)

( * ) Notice: Subject to any disclaimer, the term of this patent is extended or adjusted under 35 U.S.C. 154(b) by 0 days.

(21) Appl. No.: 09/548,652

(22) Filed: Apr. 13, 2000

(30) Foreign Application Priority Data

Apr. 14, 1999 (SE) ................................................ 9901367

(51) Int. Cl.⁷ ................................................ H01P 7/04
(52) U.S. Cl. ........................ 333/224; 333/232; 333/202
(58) Field of Search ..................... 411/378, 34; 470/10; 403/362; 333/224, 232, 202

(56) References Cited

U.S. PATENT DOCUMENTS

| | | | | |
|---|---|---|---|---|
| 1,971,917 A | * | 8/1934 | Newton ........................ 470/10 |
| 2,093,171 A | | 9/1937 | Olson ........................... 411/418 |
| 2,956,293 A | * | 10/1960 | McKay et al. ................. 470/10 |
| 3,174,521 A | | 3/1965 | Harvey ......................... 411/306 |
| 3,351,966 A | | 11/1967 | Pelochino ..................... 470/14 |
| 4,628,283 A | * | 12/1986 | Reynolds ...................... 331/68 |
| 4,963,841 A | * | 10/1990 | Sparagna .................... 333/202 |
| 4,984,946 A | * | 1/1991 | Phillips, II ..................... 411/34 |
| 4,987,714 A | * | 1/1991 | Lemke ........................ 52/410 |
| 5,755,543 A | | 5/1998 | Culpen ........................ 411/419 |
| 5,905,416 A | * | 5/1999 | Schmid et al. ............... 333/134 |
| 6,002,311 A | * | 12/1999 | Wey et al. ................. 333/219.1 |

FOREIGN PATENT DOCUMENTS

| EP | 0525378 | 2/1993 | ............. H01P/1/00 |
| FR | 2621363 | 4/1989 | ........... F16B/39/38 |
| SE | 222419 | 9/1968 | ........... F16B/47/10 |

OTHER PUBLICATIONS

Japanese Abstract No. JP7063214—"Adjustment screw for regulating frequency of bandpass filter in microwave communication and VCO", World Patents Index.

* cited by examiner

*Primary Examiner*—Robert Pascal
*Assistant Examiner*—Dean Takaoka
(74) *Attorney, Agent, or Firm*—Burns, Doane, Swecker & Mathis, L.L.P.

(57) ABSTRACT

The present invention relates to an arrangement in a cavity filter for tuning the frequency relationship of the filter or its coupling coefficient factor. The arrangement includes a self-locking screw that can be fitted in the filter cavity, for instance in the center conductor, in the filter lid, or in some suitable place in the filter chassis. Tuning is effected by adjusting the position of the screw in relation to the center conductor or lid of the cavity filter. The screw can be made of metallic segments embedded in plastic, or made completely of metal, and provided with a radially through-penetrating slot. At least one part of the screw has a cross-sectional area whose extension perpendicular to the through-penetrating slot is slightly greater than in a direction along said slot.

11 Claims, 7 Drawing Sheets

Fig. 10a
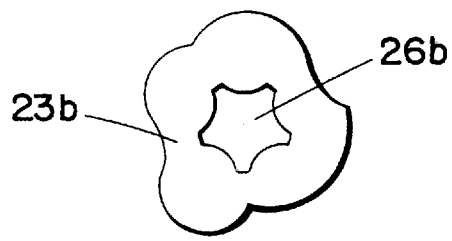
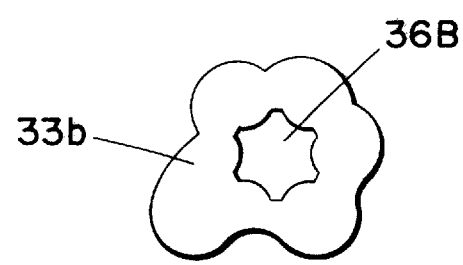
Fig. 10b

TUNING ARRANGEMENT FOR A CAVITY FILTER

FIELD OF INVENTION

The present invention relates to a cavity filter tuning screw and more particularly to a tuning screw for tuning the frequency relationship of the filter and/or the coupling coefficient factor between center conductors in the filter. The invention also relates to a tuning arrangement that includes such a screw that can be placed, for instance, in the center conductor of the cavity filter or its lid, and also at some other suitable position in the chassis of the cavity filter.

DESCRIPTION OF THE BACKGROUND ART

Radio base filters can be constructed and manufactured as so-called cavity filters which consist of a plurality of cavities either with a separate center conductor in each cavity or more than one center conductor per cavity. These filters are used, for instance, in base stations for GSM-based mobile telephony.

The filters are generally constructed with the aid of different components, such as a chassis or lid, for instance. However, filters that are not tuned when manufactured must be adjusted subsequent to being fitted, because of the influence of tolerances on the filter components. This adjustment of the filter properties is effected by tuning the filter with respect to its resonator frequencies and the couplings between the center conductors in the filter.

In a cavity filter, each cavity that includes a center conductor functions as an electric oscillator circuit that can be represented by a parallel oscillator circuit that includes an inductive part L and a capacitive part C when the filter is tuned on a quarter wavelength of the received signal. The resonator frequencies of the filter are therewith determined through the inductive and capacitive parts.

The frequencies of the cavity filter are tuned by changing the length of the center conductor and therewith the inductance, and by changing the distance from the center conductor in the cavity to the cavity lid and also to the cavity side walls, which results in a change in capacitance. Frequency adjustments must be made very accurately and also in a manner which will ensure that the set frequencies are maintained.

Tuning of the coupling coefficient factor between the center conductors in the cavity filter is effected by changing their relative distances or by changing the geometry of the filter in the space between the center conductors. This latter measure may entail providing the cavity partition walls with appropriate apertures for instance and/or providing a tuning device between said center conductors.

FIG. 1 illustrates a known method of tuning a cavity filter. The Figure is a sectioned view of a cavity filter 10 which is defined by a cavity bottom 12 and side walls 13. The cavity has provided therein a center conductor 11 which in the illustrated case is formed integrally with the bottom 12 of the cavity and extends out therefrom. The whole of the cavity is covered by a lid or cover member 15. Tuning is effected with the aid of a tuning plate 14 attached between the cavity walls and lid and functioning as an adjustable earth plane. The tuning plate is flexible to some extent, so that its position relative to the upper edge of the center conductor can be changed by screwing a screw 17 through the cavity lid 15 until the correct distance is achieved between tuning plate 14 and center conductor 11. Alternatively, tuning can be effected solely with the aid of the screw 17, the position of which in the filter lid is fixed by means of a counter nut or lock nut.

0 525 378 A2 teaches a self-locking tuning screw which consists of a first part 1 that includes two threaded segments 4, 5 and an intermediate plain or non-threaded segment 3, and a non-threaded or plain second part 2 intended for insertion in a microwaveguide. The first part of the screw includes a screwdriver accommodating recess that includes several edges which form slots at the non-threaded segment 3.

SUMMARY OF THE INVENTION

The present invention relates to a component tuning arrangement, preferably for tuning a cavity filter.

One object of the invention is to provide a screw that can be used in a cavity filter to tune the frequency relationship of the filter and which will be self-locking when fitted in the center conductor, the wall, or the lid of the filter.

Another object of the invention is to provide a screw which can be used in a cavity filter to tune the coupling coefficient factor between two center conductors in the filter and which will be self-locking when fitted in an appropriate position in the bottom of the cavity and its side-walls or lid respectively.

Still another object of the invention is to provide a tuning device which consists solely of one component in the form of a self-locking screw, thereby eliminating screw play.

These objects are achieved in accordance with the invention by means of a screw which has at least one slot extending in its axial direction and which is configured with at least one thicker part. As a result of this thicker part, the screw slot will be squeezed together as the screw is screwed-in, thereby exerting on the walls of the screw hole a force which ensures that the screw will be firmly locked in the position desired.

The inventive arrangement for tuning the frequency relationship of the filter is achieved by mounting the screw in a center conductor, side wall or lid. Tuning of the coupling coefficient factor between two center conductors is achieved by placing the screw between the center conductors in the bottom of the filter, the lid or its side walls. Tuning is effected by appropriate adjustment to the position of the screw head.

More specifically, the inventive arrangement is characterised by the features set forth in the accompanying claims.

One advantage afforded by the inventive tuning arrangement is that it consists of only one component. Because the tuning screw included in the arrangement is self-locking with a constant moment of force along the full length of the screw, no counter nuts or lock nuts are required to lock the screw in its set, desired position. Neither is a tuning plate required in order to tune the filter. This results in more rational and less expensive manufacture.

Another advantage is that tuning is facilitated by virtue of the fact that the inventive tuning arrangement includes two screwdriver accommodating recess, of which one is intended for turning the screw and the other for adjusting the position of the screw subsequent to having placed the lid in position.

Another advantage resides in greater flexibility, since the tuning screw can be readily replaced with screws of other designs, for instance with respect to the head of the screw.

BRIEF DESCRIPTION OF THE DRAWINGS

The invention will now be described in more detail with reference to preferred embodiments thereof and also with reference to the accompanying drawings.

FIGS. 10a and 10b illustrate the screw driver accommodating recess on one end of the tuning screws of FIGS. 2 and 3.

DESCRIPTION OF PREFERRED EMBODIMENTS

Figure 1:
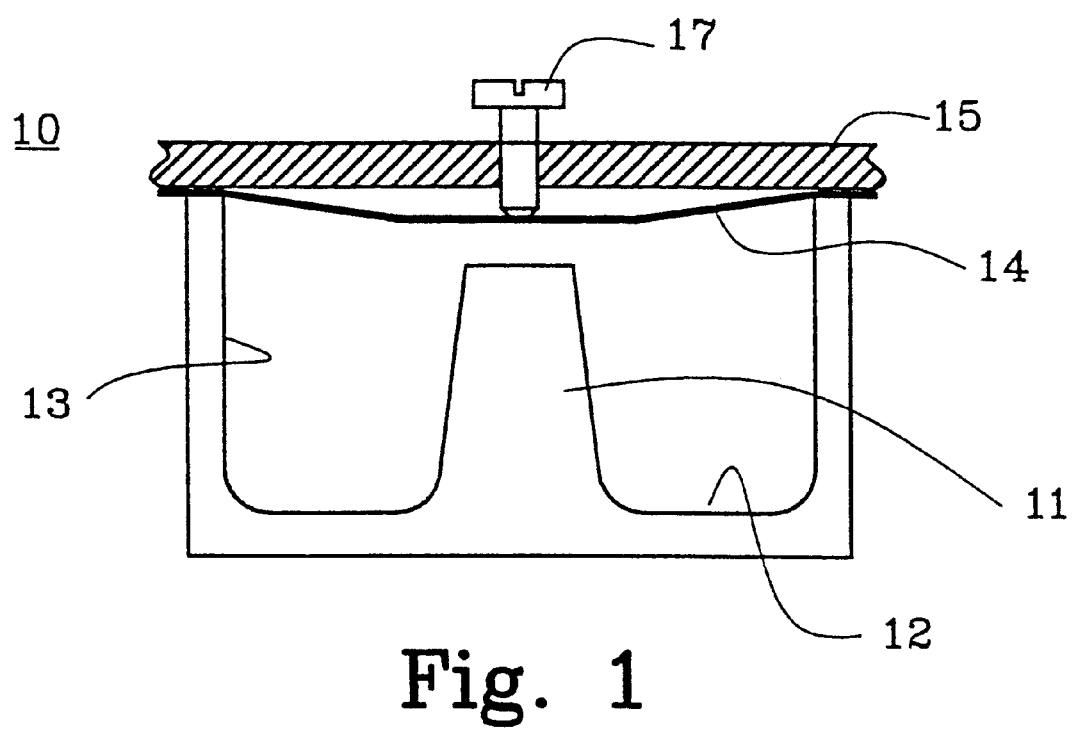
FIG. 1 shows a cavity that includes a tuning arrangement which, in turn, includes a tuning plate, wherewith tuning is effected by adjusting a screw provided in the lid.
Figure 2:
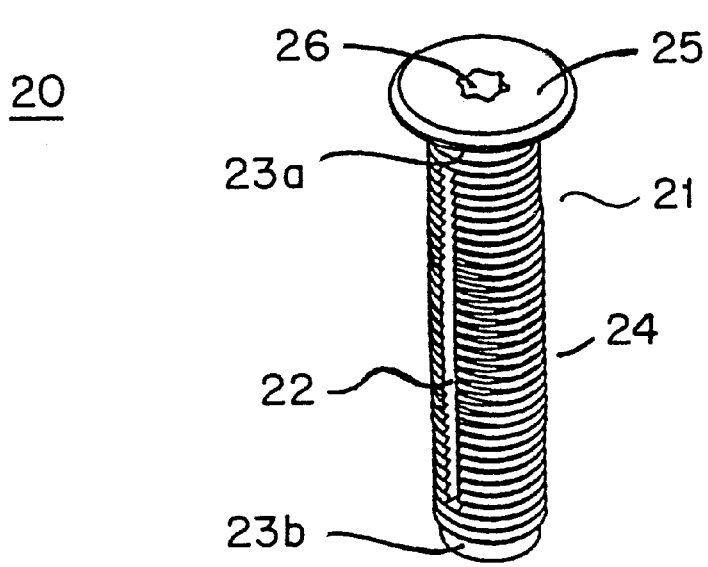
FIG. 2 illustrates a first embodiment of an inventive tuning screw.
Figure 3:
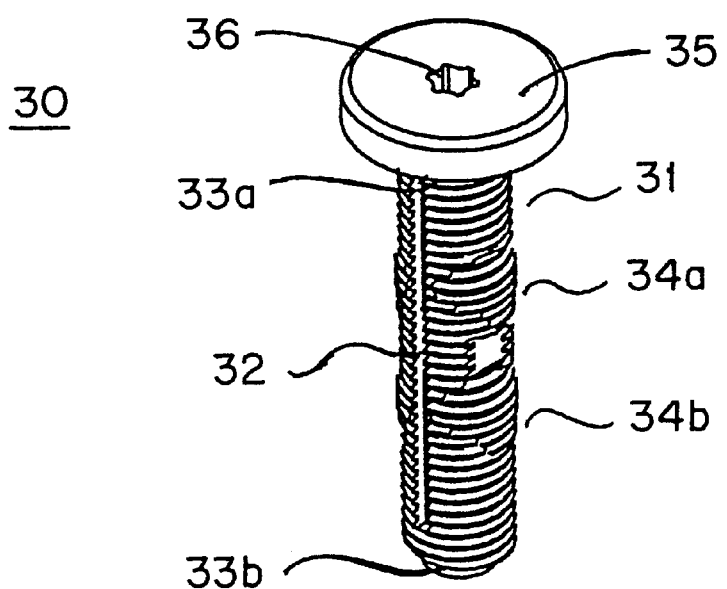
FIG. 3 illustrates a second embodiment of an inventive tuning screw.

FIGS. 2 and 3 illustrate two possible embodiments of the inventive tuning screw. The screws 20; 30 comprise a threaded screw body 21; 31 which includes two solid end parts 23a, 23b; 33a, 33b and a radially through-penetrating slot 22; 32 whose length corresponds almost to the full length of the screw body. In the case of the preferred embodiment, one end part 23a; 33a is formed with a collar 25; 35 that includes an appropriate type of screwdriver accommodating recess 26; 36. A correspondingly arranged screwdriver accommodating recess 26b; 36b is also provided at the other end 23b; 33b of the screw as illustrated in FIGS. 10a and 10b which depict end view portions of the end 23b, 33b of In a first embodiment, shown in FIG. 2, the screw body 21 includes a part 24 that has a cross-sectional area whose extension perpendicular to the through-penetrating slot 22 is slightly greater than its corresponding extension at the end part 23b of said screw body where screwing of the screw commences.

In a second preferred embodiment, shown in FIG. 3, the screw body 31 includes two parts 34a, 34b which have a cross-sectional area whose extension perpendicular to the through-penetrating slot 32 is slightly greater than the corresponding extension of the cross-sectional area of the end part 33b of the screw body where screwing of the screw commences.

The screw shall be self-locking. Accordingly, the screw is provided with at least one axially extending slot and with at least one portion that includes a cross-sectional area of greater extension perpendicular to each slot. The diameter of the screw hole therewith corresponds to the diameter of the cross-sectional area at the end part 23b; 33b where screwing of the screw commences. As the screw is screwed into the hole, the axial slot 22; 32 will be squeezed together immediately the radial extension of that part of the screw which has entered the hole becomes larger than the diameter of the screw hole, so that the screw will be screwed-in with a certain degree of friction. The axial slot 22; 32 in the screw body provides a spring effect in the screw so that a force is able to act perpendicular to the longitudinal axis of the screw. The force obtained by this spring effect acts on the walls of the screw hole in those parts 24; 34a, 34b thereof at which the cross-sectional area of the screw body has an extension greater than the diameter of the screw hole. The force causes the screw to be locked in the desired position to which it is set, so as to eliminate screw play. In order to ensure stability of the screw, even when the screw is subjected to torsion as it is screwed into the hole, the screw body 21; 31 is formed with two end parts 23a, 23b; 33a, 33b.

Figure 4:
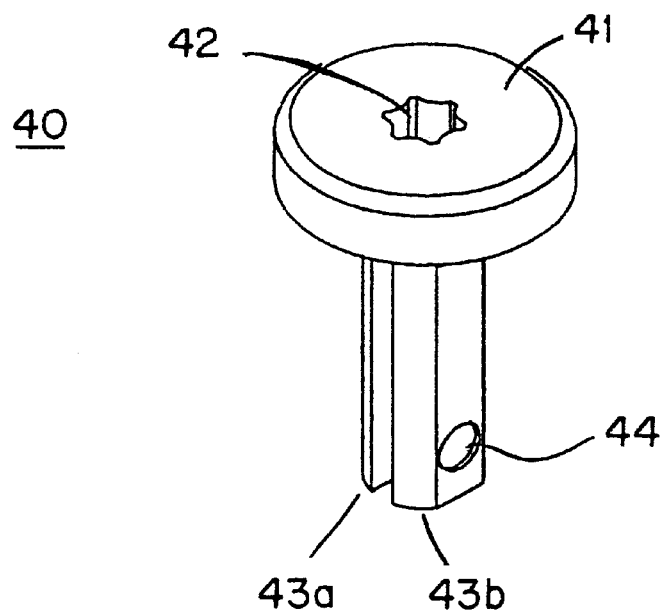
FIG. 4 is a perspective view of the upper screw segment of a tuning screw according to the preferred embodiment.
Figure 5:
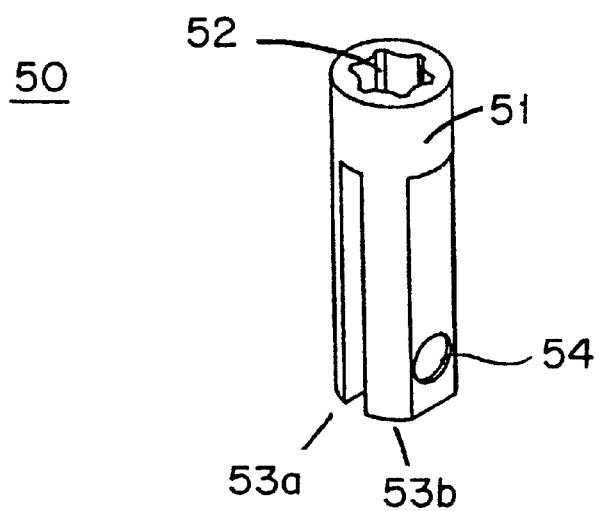
FIG. 5 is a perspective view of the bottom screw segment of a tuning screw according to the preferred embodiment.
Figure 6:
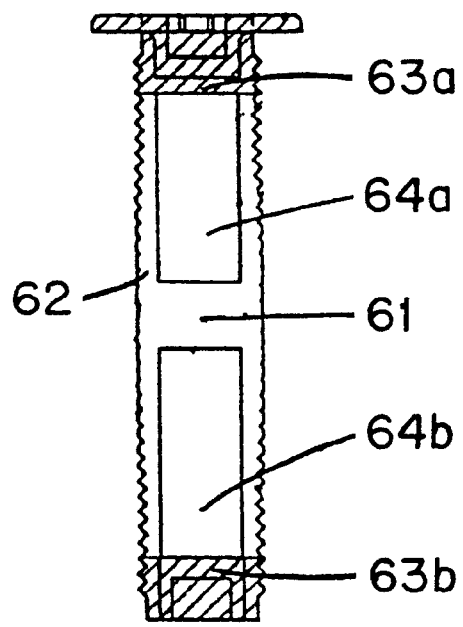
FIG. 6 is a cross-sectional view of the tuning screw according to the preferred embodiment.

In the preferred embodiment, the screw includes two metallic end parts which are embedded in a suitable plastic material. These metallic parts are shown in FIGS. 4 and 5, whereas FIG. 6 is a cross-sectional view of a tuning screw according to this preferred embodiment and including said parts. FIG. 4 shows the first metallic part 40, which has the form of a collar that provides a screw head 41 and that is provided with a screwdriver accommodating recess 42. The part 40 also includes a short solid part that has two mutually parallel legs 43a, 43b. The shape of the screw head can be varied to suit the area of use of the tuning screw. FIG. 5 illustrates the other metallic part 50, which comprises a shorter solid part 51 that includes a screwdriver accommodating recess 52 and two mutually parallel legs 53a, 53b. One of the legs 43b; 53b has been provided with a hole 44; 54 at each segment, so as to enable the parts to be fixed in the plastic material in manufacture and to counteract movement therebetween. In an alternative embodiment, each of the parts 40; 50 may comprise only one leg.

In the case of the tuning screw according to the preferred embodiment, the metallic end parts 63a, 63b may be disposed so that the free end-parts of the legs 64a, 64b are positioned mutually opposite each other at a given distance apart, so as to form a free space 61 between said parts, as illustrated in FIG. 6. In the manufacture of the screw body, a portion of said solid parts, said legs and the space present between said parts are embedded in a plastic material 62. The slots between the legs and a slot in the space between said parts is omitted, wherewith the radially through-penetrating slot is formed in the axial direction of the screw body. The plastic body 62 is provided with a screw thread such as to form a screw body that can be screwed into a corresponding screw hole.

When mounted in a cavity filter, the inventive screw can be represented by two series-connected capacitances C1 and C2. The capacitance C1 is obtained between the screw head and the lid of the cavity filter, whereas the capacitance C2 is obtained between the legs of the screw segment and that part of the cavity filter where the screw has been fitted. For instance, when the screw is backed-off in the screw hole to a given extent, the capacitance C1 will be increased since the distance between its active surfaces decreases. The total capacitance resulting from the series connection shall be comprised chiefly of the capacitance C1, since this capacitance is influential with respect to the resonator frequency of the cavity. Consequently, the capacitance C2 must be considerably greater than the capacitance C1. In order to maintain this relationship, even in the event of displacements, it is necessary for the legs 43a, 43b of the part 40 to be dimensioned with a length such that the area of the active surface in respect of C2 will be sufficiently large along the full tuning length of the screw to ensure that C2 will be greater than C1 in all positions.

A plastic material suitable for manufacture of the screw must have high temperature stability and good mechanical stability. The coefficient of linear expansion of the plastic material must correspond to the coefficient of linear expansion of the metal in its surroundings. The plastic material must also have low electric losses, so that it will not absorb a significant part of the electrical energy. A suitable plastic material in this respect is polyethyleneimide (PEI) or polyarylamide (PAA). A suitable metal must primarily have good resilience. Examples of suitable metals are tin bronze or beryllium copper. These metals can be coated with a material that is a good conductor of electricity.

The inventive tuning screw may be produced in alternative forms. In the case of a first alternative embodiment, the screw body is produced with only one metallic part. The part shown in FIG. 4 is provided at one end of the screw and is partially moulded in the plastic material and preferably provided with a screwdriver accommodating recess and a collar that forms the screw head. The other end-part of the screw is formed in plastic and includes a second screwdriver accommodating recess. The choice of material used is governed by the same criteria as that in the preferred embodiment.

In a second alternative embodiment, the screw is manufactured entirely from metal. However, in the case of this embodiment effective galvanic contact is required between the screw body and the body into which the screw shall be fitted. The screw is made, for instance, from tin bronze or beryllium copper and is silver plated in order to obtain a low resistance at the transition between screw and screw hole, and also to provide good conductivity.

Figure 7:
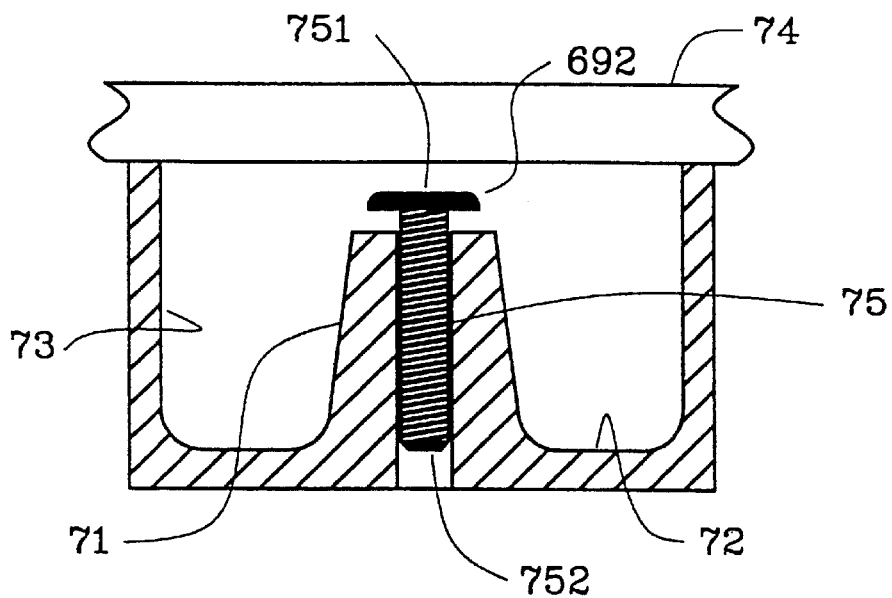
FIG. 7 shows a cavity in a cavity filter that includes a first embodiment of the inventive tuning arrangement, wherein the tuning screw according to FIG. 2 or FIG. 3 for instance has been arranged in a center conductor in a cavity filter.
Figure 8:
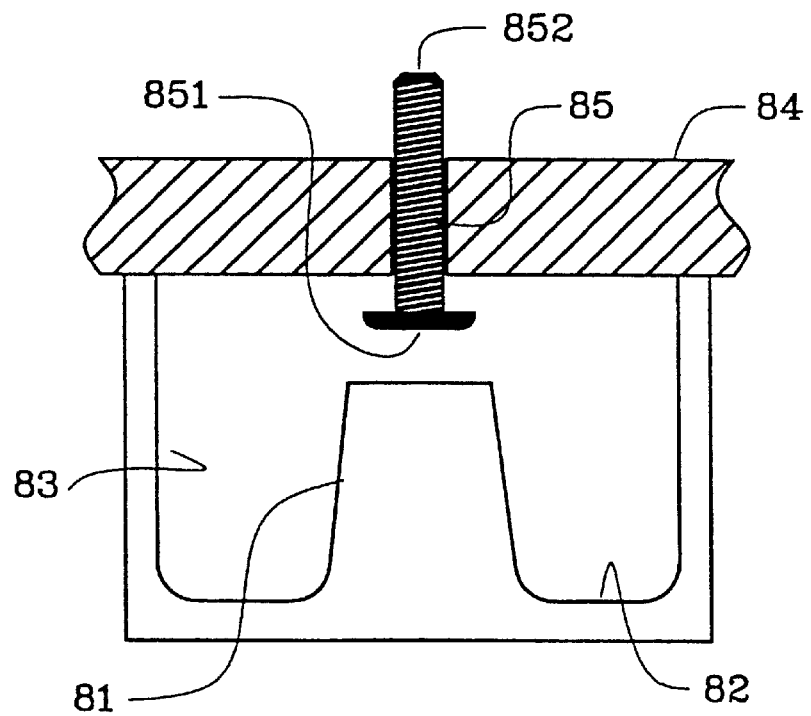
FIG. 8 illustrates a cavity in a cavity filter that includes an alternative embodiment of the inventive tuning arrangement, wherein the tuning screw of FIG. 2 or FIG. 3 for instance has been arranged in the filter lid.

FIGS. 7 and 8 show the inventive tuning screw when used in two alternative arrangements for tuning the frequency relationship of the cavity filter.

FIG. 7 shows a cavity in a cavity filter including a center conductor 71 in which the inventive tuning screw has been fitted. The cavity is defined by a cavity bottom 72 and side walls 73. In this embodiment, the center conductor 71 is formed directly from the cavity bottom 72 and is an integral part of said bottom. The center conductor includes a through-penetrating bore which is partially threaded so that the screw can be screwed thereinto. The entire cavity is covered by a lid 74. The tuning arrangement is implemented by the tuning screw 75 screwed into the center conductor 71. As described above, the tuning screw 75 is comprised of a screw body that includes at least one radially through-penetrating slot and at least one part that has a larger cross-sectional surface area of greater extension perpendicular to the slot than other parts of the screw. The tuning screw 75 is preferably provided at one end with a collar 751 formed as a screw head, and at least the other end 752 of the screw is provided with a screwdriver accommodating recess. Since the screw is self-locking, it can be affixed in a stable fashion in any chosen position in the center conductor 71, when screwing in the screw. The distance between the screw head 751 and the lid 74 is decisive with respect to tuning components, said distance determining the resonator frequency of the cavity. This distance is varied by varying the extent to which the screw enters the center conductor. When the screw 75 has two screwdriver accommodating recess, the recess on the screw head 751 is preferably used to screw the screw into the center conductor 71, while the other recess at the other end 752 of the screw body is conveniently used to finely adjust the position of the screw when the lid 74 has been placed on the cavity.

The inventive tuning screw may alternative be disposed in the cavity lid. This alternative embodiment is shown in FIG. 8. The cavity is defined by a cavity bottom 82 and side walls 83. Arranged in the cavity is a center conductor 81 which has been formed directly from the cavity bottom 82 in the case of this embodiment. The tuning screw 85 has the same design as the screw described above with reference to FIG. 7. The tuning screw 85 is inserted into a threaded hole in the lid 84, which shall be constructed to ensure that the tuning screw 85 will be stably fastened. A decisive tuning factor is the distance between the screw head 851 located in the cavity and the upper surface of the center conductor, this distance determining the resonator frequency of the cavity. The distance can be varied by varying the depth of penetration of the screw in the lid. When the tuning screw 85 has two screwdriver accommodating recess, the recess on the screw head 851 is preferably used to screw the screw into the lid 84, whereas the other recess on the other end 852. of said screw body can be used conveniently to finely adjust the position of the screw when the lid 84 has been placed on the cavity.

Figure 9:
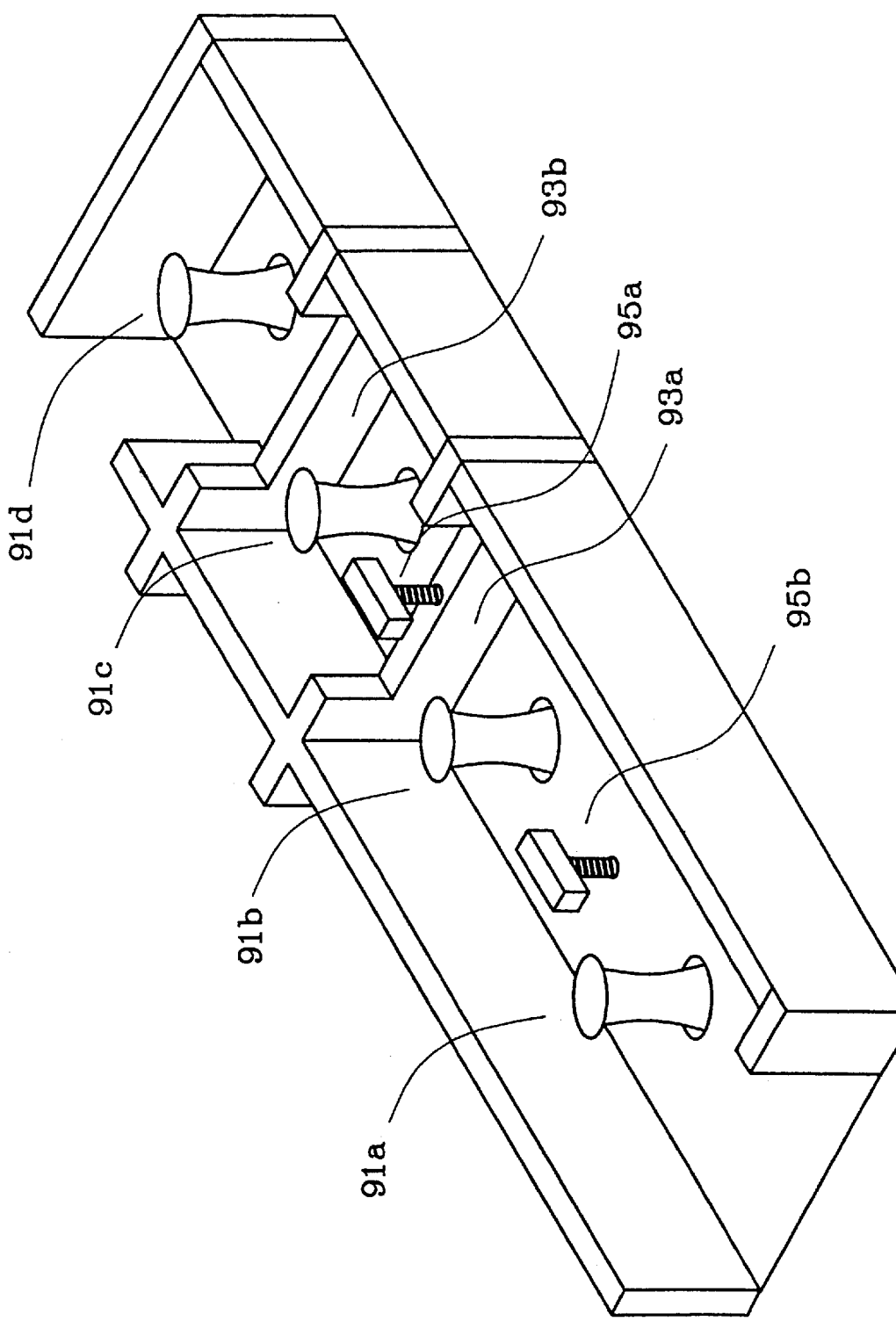
FIG. 9 illustrates part of a cavity filter wherein the tuning screw of FIG. 2 or FIG. 3 for instance is used for tuning the coupling coefficient factor between center conductors.

FIG. 9 illustrates the inventive tuning screw 95a, 95b when used to tune the coupling coefficient factor between two center guides in the cavity filter. The illustrated part of the cavity Figure comprises three cavities, wherein two center guides 91a, 91b have been arranged in one and the same cavity and each of a further two center guides 91c, 91d has been arranged in a respective cavity. The coupling coefficient factor between two center guides is determined in a first stage by their relative distance and position and can be varied, for instance, through suitable recesses or cut-outs in the cavity partition walls 93a, 93b. The coupling coefficient factor can then be tuned by means of the inventive tuning arrangement, which is comprised of a tuning screw 95a, 95b as described above with reference to FIG. 7 and arranged in the space between two center conductors. The tuning screw 95a for tuning the coupling coefficient factor between the center guides 91b, 91c is placed in the recess in the wall 93a present between the center conductors. The inventive tuning arrangement can be arranged advantageously in cavities that include more than one center conductor where the coupling coefficient factor cannot be varied by mechanical treatment of the partition walls. In this case, the tuning screw 95b is placed between the center conductors 91a, 91b on the bottom of the filter.

It will be understood that the invention is not restricted to the aforedescribed and illustrated embodiments thereof, and that modifications can be made within the scope of the accompanying claims.

What is claimed is:

1. A screw arrangement, characterised by an at least partially threaded screw body that includes at least one slot extending in the axial direction of the screw body, wherein the screw body has at least one part that has a cross-sectional area whose extension perpendicular to a slot is slightly greater than the corresponding extension at the end part of said body at which screwing of the screw commences, and wherein at least one of the ends of the screw body includes a screwdriver accommodating recess; and said screw body including two terminating metallic parts that include at least one leg disposed along the inside of the axially extending slot in said screw body, wherein the legs of respective parts are spaced at a given distance apart, and wherein the two parts are fixed in relation to one another with a coating of plastic material.

2. A screw arrangement according to claim 1, characterised in that said part is located in the middle portion of the screw body.

3. A screw arrangement according to claim 1, characterised in that the screw body has first and second portions which are disposed axially on respective sides of the center part of said body.

4. A screw arrangement according to claim 1, characterised in that the slot extends transversely through the screw body in the radial direction of said body.

5. A screw arrangement according to claim 1, characterised in that one end part includes a collar which provides a large surface, wherein at least the other end part includes a screwdriver accommodating recess.

6. A screw arrangement according to claim 1, characterised in that the plastic material is polyethyleneimide or polyarylamide.

7. A screw arrangement according to claim 1, characterised in that said metallic material is tin bronze or beryllium copper.

8. A screw arrangement according to claim 1, characterised in that the screw is silver plated.

9. A tuning arrangement in a cavity filter comprising at least one cavity that has at least one center conductor in each cavity, wherein the cavities are covered with a lid, characterised in that at least one of the center conductors is provided with an axially through-penetrating threaded screw hole and a screw, said screw having an at least partially threaded screw body that includes at least one slot extending in the axial direction of the screw body, wherein the screw body has at least one part that has a cross-sectional area whose extension perpendicular to a slot is slightly greater than the corresponding extension at the end part of said body at which screwing of the screw commences, and wherein at least one of the ends of the screw body includes a screwdriver accommodating recess; and said screw body including two terminating metallic parts that include at least one leg disposed along the inside of the axially extending slot in said screw body, wherein the legs of respective parts are spaced at a given distance apart, and wherein the two parts are fixed in relation to one another with a coating of plastic material, said screw being fitted adjustably in the screw hole of the center conductor.

10. A tuning arrangement in a cavity filter comprising at least one cavity and at least one center conductor in each cavity, wherein the cavities are covered with a lid, characterised in that the lid includes at least one through-penetrating threaded screw hole and a screw, said screw having an at least partially threaded screw body that includes at least one slot extending in the axial direction of the screw body, wherein the screw body has at least one part that has a cross-sectional area whose extension perpendicular to a slot is slightly greater than the corresponding extension at the end part of said body at which screwing of the screw commences, and wherein at least one of the ends of the screw body includes a screwdriver accommodating recess; and said screw body including two terminating metallic parts that include at least one leg disposed along the inside of the axially extending slot in said screw body, wherein the legs of respective parts are spaced at a given distance apart, and wherein the two parts are fixed in relation to one another with a coating of plastic material which is fitted adjustably in the screw hole in said lid.

11. A tuning arrangement in a cavity filter comprising at least one cavity and at least one center conductor in each cavity, wherein the cavities are covered with a lid, characterised by a screw, said screw having an at least partially threaded screw body that includes at least one slot extending in the axial direction of the screw body, wherein the screw body has at least one part that has a cross-sectional area whose extension perpendicular to a slot is slightly greater than the corresponding extension at the end part of said body at which screwing of the screw commences, and wherein at least one of the ends of the screw body includes a screwdriver accommodating recess; and said screw body including two terminating metallic parts that include at least one leg disposed along the inside of the axially extending slot in said screw body, wherein the legs of respective parts are spaced at a given distance apart, and wherein the two parts are fixed in relation to one another with a coating of plastic material arranged adjustably between two center conductors.

* * * * *